US007823071B2

(12) United States Patent
Matthews et al.

(10) Patent No.: US 7,823,071 B2
(45) Date of Patent: Oct. 26, 2010

(54) USER INTERFACE START PAGE

(75) Inventors: David A. Matthews, Seattle, WA (US); Kanwal VedBrat, Seattle, WA (US); Hillel N. Cooperman, Sammamish, WA (US); Sterling M. Reasor, Bellevue, WA (US); Charles Cummins, Seattle, WA (US); J. Craig Hally, Sammamish, WA (US); Mark R. Ligameri, Snohomish, WA (US); Timothy P. McKee, Seattle, WA (US); Giampiero M. Sierra, Seattle, WA (US); Timothy D. Noonan, Issaquah, WA (US); Eric R. Flo, Sammamish, WA (US); Charles W. Stabb, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 901 days.

(21) Appl. No.: 10/783,382

(22) Filed: Feb. 20, 2004

(65) Prior Publication Data

US 2005/0188314 A1   Aug. 25, 2005

(51) Int. Cl.
    G06F 3/00         (2006.01)
(52) U.S. Cl. .................. 715/750; 715/778; 715/779; 715/800
(58) Field of Classification Search .............. 715/750, 715/778, 779, 800
    See application file for complete search history.

(56) References Cited

U.S. PATENT DOCUMENTS

| 5,105,184 A | 4/1992 | Pirani et al. |
| 5,564,004 A | 10/1996 | Grossman et al. |
| 5,694,561 A | 12/1997 | Malamud et al. |
| 5,781,894 A | 7/1998 | Petrecca et al. |
| 5,905,492 A | 5/1999 | Straub et al. |
| 6,011,537 A | 1/2000 | Slotznick |
| 2003/0046557 A1 | 3/2003 | Miller et al. |
| 2003/0088570 A1* | 5/2003 | Hilbert et al. ............... 707/100 |
| 2003/0122864 A1 | 7/2003 | Jenne et al. |
| 2003/0163576 A1 | 8/2003 | Janssen et al. |

OTHER PUBLICATIONS

Rathbone, Adam, Windows XP for Dummies, 2001, Wiley Publishing Inc., pp. 63, 66, 73, 159, 165, 166, 167, 168, 169, 233, 234, 235, 276.*
Ricart, Manuel, The Complete Idiot's Guide to Linux, Second Edition, 2000, Que Corp. pages: 66, 67.*
Grebler, Eric, Lindows, May 7, 2003, Premier Press, pp. 1.*
Mac OS X 10.1, Apple 1987-2001, http://www.guidebookgallery.org/screenshots/macosx101, pp. 1-5.*

(Continued)

*Primary Examiner*—Steven P Sax
*Assistant Examiner*—Andrey Belousov
(74) *Attorney, Agent, or Firm*—Lee & Hayes, PLLC

(57) ABSTRACT

In an implementation of user interface start page, the start page includes a user-identifiable indicator associated with a user of a computing system to indicate that the user is logged-on to the computing system. The user interface start page also includes user-selectable controls from one or more regions of a user interface desktop page which is displayed after a transition from the user interface start page to the user interface desktop page. Each of the user-selectable controls on the user interface start page initiate a display of information associated with the user when selected.

62 Claims, 6 Drawing Sheets

OTHER PUBLICATIONS

GNOME 2.2.0 in RedHat 9, Feb. 5, 2003 release; www.gnome.org/press—www.guidebookgallery.org/screenshots/gnome220redhat9, pp. 1-2.*

Enin, "Batch Launcher 1.0", retrieved on Feb. 28, 2007, at <<http://www.simtel.net/product.php[id]62501[cid]301[SiteID]simtel.net>>, GadgetCity, 2006, pp. 1-3.

Langer, "Visual QuickStart Guide Mac OS X 10.1", Maria Langer, 2002, pp. 5.

Rican, The Complete Idiots Guide to Linux, Que Corporation, USA, 2000, pp. 67, 71.

* cited by examiner

USER INTERFACE START PAGE

TECHNICAL FIELD

This invention relates to a user interface start page.

BACKGROUND

When a computing device is turned-on, or logged-off of by another user, a user of the computing device is presented with a user interface display to logon to the computing device. When the user selects an account to initiate a computing session and provides a password if necessary, the user interface logon display disappears (e.g., is no longer displayed) and, after a delay, the user is presented with a user interface desktop that may include various icons, and selectable commands, files, controls, and/or links by which the user may begin the computing session.

However, when a user initiates the computing session from the user interface logon display, there is no continuity from the user interface logon display to the user interface desktop. The display may appear to change suddenly from the logon display to the desktop display, or a blank display may appear for a duration after the logon display and before the desktop display. This sudden change or blank delay detracts from the overall user experience when interfacing with the computing system.

SUMMARY

User interface start page is described herein.

In an implementation, a user interface start page includes a user-identifiable indicator associated with a user of a computing system to indicate that the user is logged-on to the computing system. The user interface start page also includes user-selectable controls from one or more regions of a user interface desktop page which is displayed after a transition from the user interface start page to the desktop page. Each of the user-selectable controls on the user interface start page initiate a display of information associated with the user when selected.

BRIEF DESCRIPTION OF THE DRAWINGS

The same numbers are used throughout the drawings to reference like features and components. The design, structure, and functional configurations of the user interfaces illustrated in the drawings are merely exemplary to illustrate various features and aspects of user interface start page. Any number of different user interface designs, structures, and functions may be implemented in varying configurations to implement embodiments of user interface start page.

DETAILED DESCRIPTION

Figure 1:
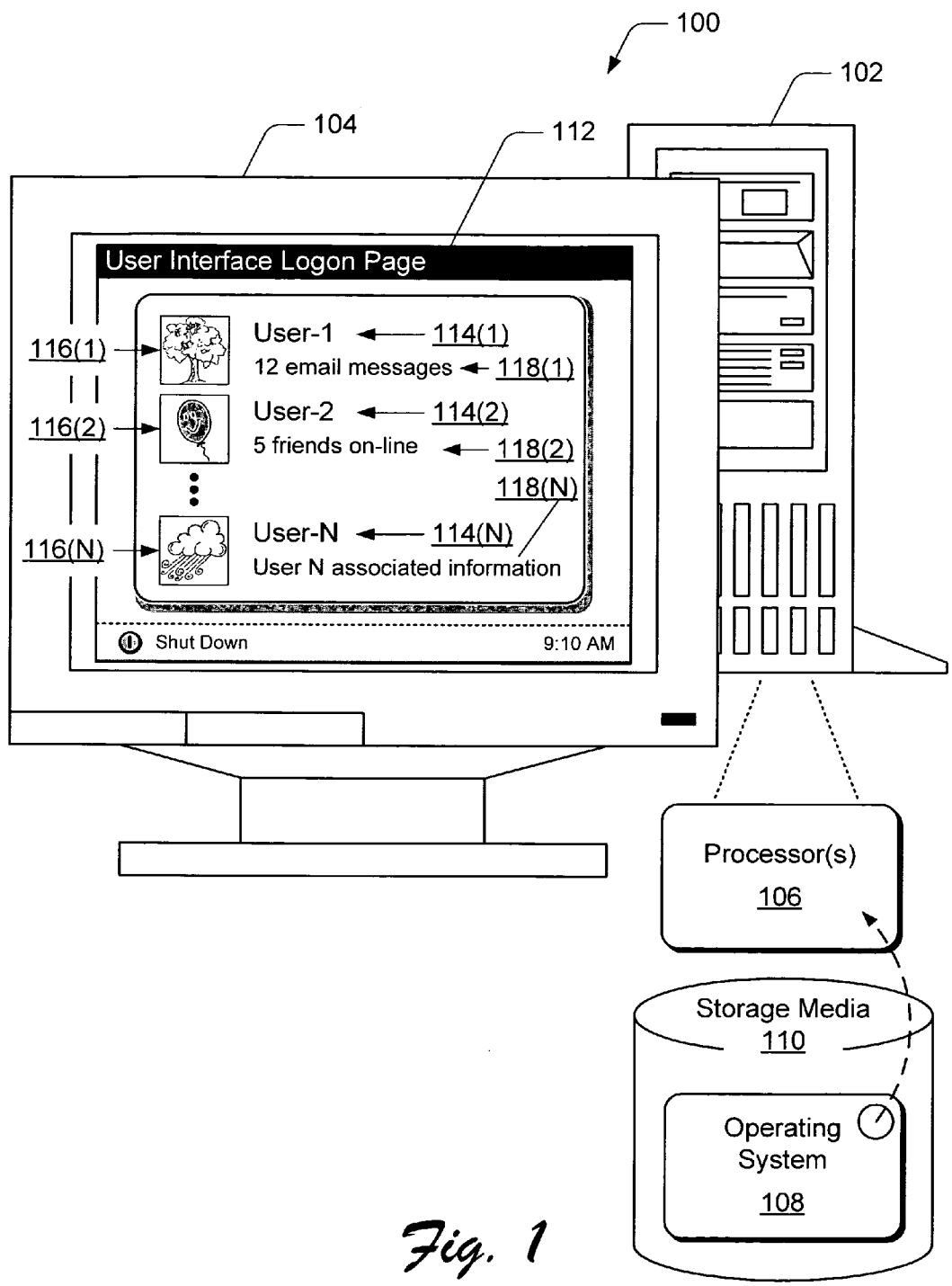
FIG. 1 illustrates various components of a computing system in which an exemplary embodiment of user interface start page can be implemented.

A user interface transition is described in which a user interface logon page is displayed from which a user can log onto a computing system. The user interface logon page includes selectable logon controls that each have a corresponding user-identifiable indicator, such as a user name and/or an image associated with a particular user. A first transition from the user interface logon page to a user interface start page is initiated in response to a selectable logon control being selected, and the user-identifiable indicator(s) corresponding to the selectable logon control are displayed uninterrupted throughout the transition.

The user interface start page is displayed with the user-identifiable indicator(s) (e.g., the user name, image, or associated information) corresponding to the selectable logon control. A second transition from the user interface start page to a user interface desktop page is initiated in response to a user-selectable control being selected on the user interface start page. The user-identifiable indicator(s) corresponding to the selectable logon control are displayed uninterrupted throughout the continued transition. The user interface desktop page is displayed with the user-identifiable indicator(s) from the user interface logon page.

The user interface start page includes the user-identifiable indicator associated with the user of the computing system to indicate that the user is logged-on to the computing system. The user interface start page also includes user-selectable controls, information, and/or resources from one or more regions of the user interface desktop page. The user-selectable controls, information, and resources are displayed on the user interface start page because they are likely of interest to, and/or associated with, the particular user logged onto the computing system. The user interface start page represents a tailored and optionally-configurable representation of a computing session displayed as a desktop page after the transition from the user interface start page. This continuous, seamless, and uninterrupted transition from the user interface logon page to the user interface start page, and from the start page to the user interface desktop page enhances the overall user experience of a computing session.

Further, the user can initiate multiple applications from the user interface start page or from the user interface desktop page. In an implementation, a user interface start page or desktop page includes a user-selectable control to initiate that multiple applications start together at approximately a same time. The user interface includes user-selectable configurations to designate a multiple application start-up configuration. For example, a user can select groups of application programs to start together such as application programs that were executing when a previous computing session was discontinued, application programs often selected for use by the user, application programs recently selected for use by the user, and/or application programs most used by the user.

The following discussion is directed to systems and methods for user interface start page. While features of the described systems and methods can be implemented in any number of different computing environments, they are described in the context of the following exemplary implementations.

FIG. 1 illustrates various components of a computing system 100 in which an exemplary embodiment of user interface start page can be implemented. The computing system 100 includes a computing device 102 and a display device 104 to display operating system user interfaces (also referred to herein as various user interface pages). The computing device 102 includes one or more processors 106 (e.g., any of microprocessors, controllers, and the like) which execute an operating system 108 and process computer executable instructions to implement features of user interface start page.

The computing system 100 can be implemented with one or more memory components, such as any form of storage media 110 (e.g., any of RAM, ROM, and the like), which maintains operating system 108. The computing system 100 may be implemented with any number and combination of differing components as further described below with reference to the exemplary computing systems, devices, and components shown in FIG. 6. Further, although operating system 108 is illustrated and described as a single application program, the operating system 108 can be implemented as several component applications distributed to each perform one or more functions of user interface start page.

In this example, display device 104 displays a user interface logon page 112 that includes any number of selectable logon controls 114(1-N) each corresponding to a user of the computing system 100. Typically, when computing device 102 is turned-on, or logged-off of by another user, the operating system 108 initiates a display of the user interface logon page 112 so that any user of the computing system 100 can logon to the computing device 102.

The user interface logon page 112 also includes user-identifiable indicators that correspond to, or are implemented as, the selectable logon controls 114(1-N). For example, a selectable logon control 114 can be displayed as a user name to identify a user of the computing system 100. Alternatively and/or in addition, a corresponding user-identifiable indicator can be displayed as an image that is recognizable and optionally configurable by a user, such as images 116(1-N) that each correspond to a respective selectable logon control 114(1-N). A user-identifiable image 116 may also be implemented as a selectable logon control 114 on a user interface logon page 112.

The user interface logon page 112 may also include user information 118(1-N) that corresponds to the selectable logon controls 114(1-N) and/or user-identifiable indicators (e.g., images) 116(1-N). In this example, User-1 114(1) corresponding user information 118(1) indicates that User-1 has twelve new e-mail messages, and User-2 114(2) corresponding user information 118(2) indicates that User-2 currently has five friends on-line. User information 118 corresponding to a selectable logon control 114 can include any type or form of information, to include text, a graphic, an image, and/or any combination thereof.

Figure 2:
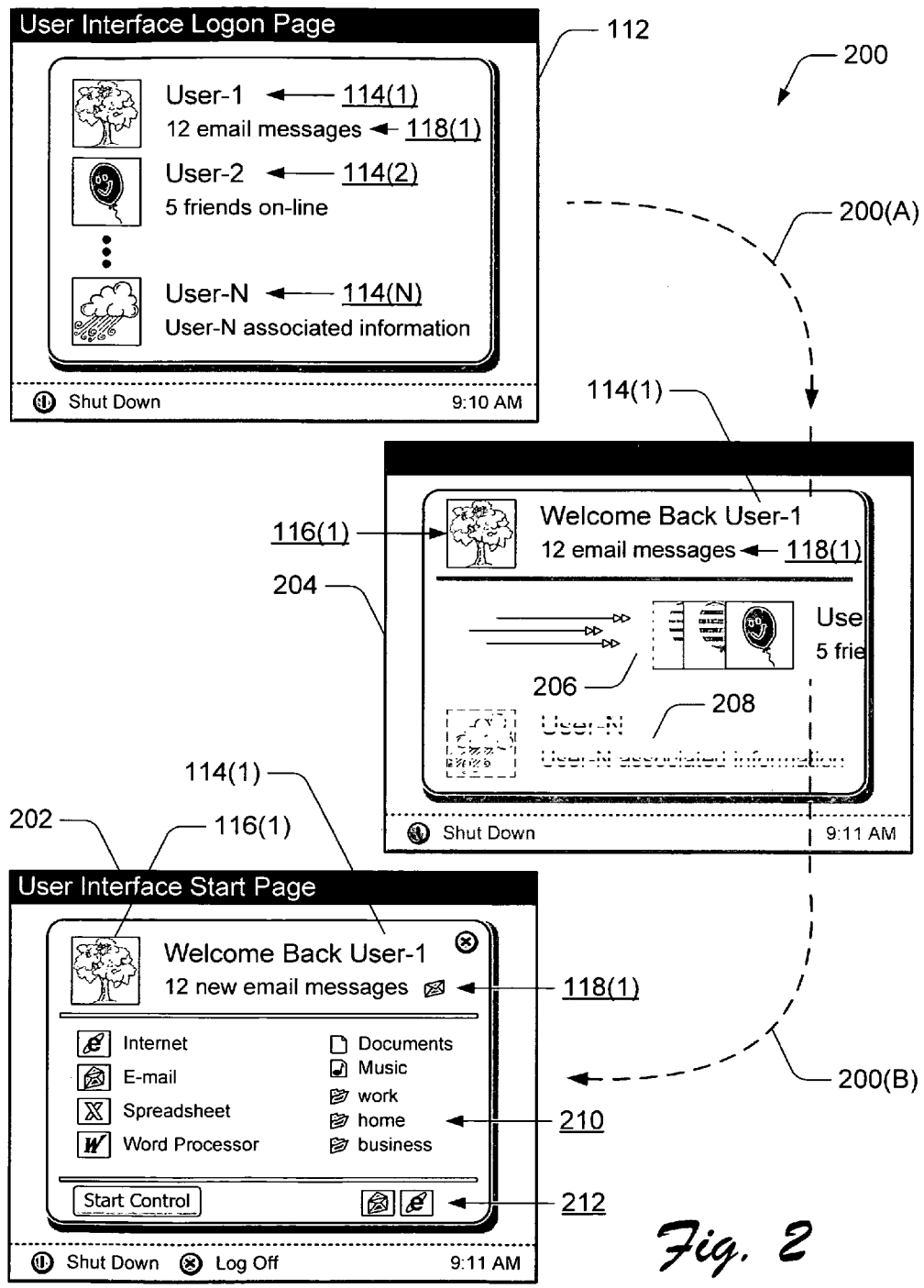
FIG. 2 illustrates an embodiment of a transition from an exemplary user interface logon page to an exemplary user interface start page.

FIG. 2 illustrates an embodiment of a transition 200 from the exemplary user interface logon page 112 to an exemplary user interface start page 202. The transition 200 is illustrated as a continually evolving display with a transition 200(A) from the user interface logon page 112 to transition page(s) 204 and continuing with a transition 200(B) from the transition page(s) 204 to the user interface start page 202. Although shown as only one page or user interface display, transition page 204 is representative of any number of "frames" (e.g., to use a video reference) to represent a continuous, seamless, and uninterrupted transition from the user interface logon page 112 to the user interface start page 202.

During the transition 200, a user-identifiable indicator corresponding to a selectable logon control is displayed uninterrupted throughout the transition. For example, in an event that a user of the computing system 100 selects the selectable logon control 114(1), the user's name, User-1, and/or the corresponding image 116(1) is displayed throughout the transition 200(A-B) on the transition page(s) 204 and on the user interface start page 202. Additionally, User-1 corresponding user information 118(1) may also be displayed throughout the transition 200(A-B) on the transition page(s) 204 and on the user interface start page 202.

The transition page(s) 204 can be visually animated to convey the transition 200 to a user. For example, while the user-identifiable indicators corresponding to the selected logon control for User-1 114(1) are continually displayed throughout the transition, the indicators and information corresponding to User-2 114(2) and User-N 114(N) are eliminated from the display. For example, User-2 114(2) is shown to slide right 206 and off of the display page during the transition page(s) 204. User-N 114(N) is shown to fade away 208 from view on the transition page(s) 204. The indicators and information corresponding to the selectable logon controls that are not selected can be eliminated from the display utilizing any number of methods and techniques to visually animate the transition 200.

The exemplary user interface start page 202 can be displayed with any number of selectable controls 210, information, and application program selectable start controls 212 that, when selected, initiate a display of information and/or an application program associated with the particular user logged-on to the computing system 100. The user interface start page 202 includes (optionally user-definable) information and selectable controls that are more likely of interest and/or associated with the particular user, such as when the user starts the computing device 102 or returns to a computing session. For example, a user interface start page may include any one or combination of application programs, documents, Web links, personal contacts, e-mail, and any other form of information and images such as live data feeds of news, sports, weather, and the like.

Figure 3:
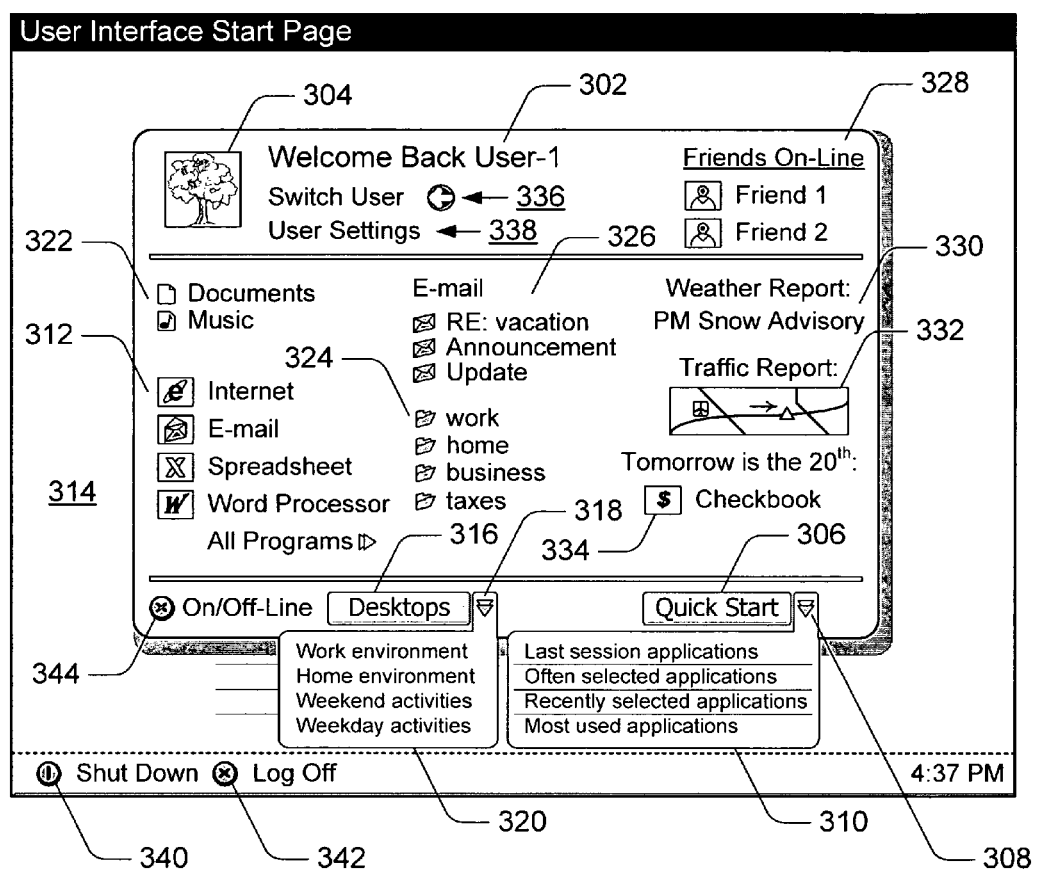
FIG. 3 illustrates various features of an embodiment of a user interface start page.

FIG. 3 illustrates various features of an embodiment of a user interface start page 300 which includes user-identifiable indicators associated with a user of the computing system 100 (FIG. 1) to indicate that the user is logged-on to the computing system. For example, the user interface start page 300 includes a user name 302 and an image 304 as user-identifiable indicators. The user interface start page 300 also includes resources, information, and selectable controls that are more likely of interest and/or associated with the particular user (e.g., User-1 in this example).

The user interface start page 300 includes a start control 306 that is user-selectable to initiate that multiple application programs start together at approximately a same time (e.g., the applications start together after a single user input). The start control 306 may be configurable, or a selectable configuration control 308 may be implemented, such that a user can select to initiate different groups 310 of application programs. In this example, the groups of application programs that can be selected to start together include application programs that were executing when a previous computing session was discontinued, application programs often selected for use by the user, application programs recently selected for use by the user, and/or application programs most used by the user (e.g., application programs executing for at least a minimum duration).

In this example, a user may also select any number of application programs from a list of application programs 312 to initiate that the multiple selected application programs start together at approximately a same time. For example, a user of computing system 100 can individually select various applications, such as an e-mail application, a Web browser, and a word processor from the list of application programs 312, and then initiate that the various selected application programs start together. To initiate starting the selected application programs, a user may simply mouse-click in a region 314 of the user interface start page 300 that is outside of the region containing the information and selectable controls. Alternatively, a user may initiate the selected various applications with a designated user-selectable control, with a keystroke combination input from a keyboard, or with any number of other user-input techniques and/or combinations of sequenced inputs. Further, although initiating multiple application programs is described and illustrated with reference to the user interface start page 300, multiple application programs can also be started together from any user interface desktop page, such as desktop page 402.

The user interface start page 300 includes a desktop selection control 316 that may be configurable, or a selectable configuration control 318 may be implemented, such that a user can select from various desktop pages 320 as a beginning of a computing session. In this example, the various desktop pages 320 include a work environment desktop, a home environment desktop, a weekend activities desktop, and a weekday activities desktop.

A user can select any such desktop environment or page to coincide with a user's "persona" for a particular computing session. For example, a work environment desktop may include information corresponding to a place of business and selectable controls corresponding to work-related application programs. A home environment desktop may include information corresponding to a user's home life, such as the local weather, a TV guide, a movie listing for local movie show times, a personal e-mail account, personal Web links, a personal desktop background image, and/or any combination of these and other information and resources. Similarly, a weekend activities desktop may include some or all of the information and resources included in a home environment desktop, and a weekday activities desktop may include some combination of the information and resources included in the work environment desktop and the home environment desktop. The various desktop environments are configurable for efficiency and ease-of-use corresponding to a particular environment, or persona, that a user selects for a computing session.

The list of application programs 312 may include application programs recently accessed by the user (e.g., in previous computing sessions) and/or application programs designated for user-selection from the user interface start page 300. The user interface start page 300 also includes a list of documents 322 recently accessed by the user and/or documents designated for user-selection from the user interface start page, and a list of directory locations 324 in computing system 100 recently accessed by the user and/or designated for user-selection from the user interface start page. The start page 300 may also include other user-associated information and resources such as a list of e-mail notifications 326 that each correspond to an e-mail received after a previous computing session was discontinued, and a list of on-line users 328 (e.g., friends or buddies that are interconnected on-line). A user can select the friends or on-line users for display notification on the user interface start page 300 when the a designated user is on-line.

The user interface start page 300 can also include any form of a time-based and/or a date-based display of information which may correspond to an environment of the user. For example, a weather report 330 is displayed to advise of impending weather in an area where the user lives, and, after 4:30 p.m. on a weekday, a traffic report 332 may be displayed to advise the user of the traffic conditions for a commute after work. As shown in the user interface start page 300, the time-based and date-based display of information may be text, a graphic, an image, and/or any other form of indication. An example of a date-based user-selectable control 334 is displayed for a financial application program associated with a user that regularly accesses a checkbook on the $20^{th}$ of every month. These are only some examples of the many possible time-based and/or date-based information and application programs that can be displayed on a user interface start page.

The user interface start page 300 can also include various other user-selectable controls and information, such as a switch user control 336 (e.g., a "back" button) to initiate a transition back to the user interface logon page 112 (FIGS. 1-2), and a user settings change control 338 by which a user can configure and change the display settings of the user interface start page 300 and the list information included in the display. The user interface start page 300 also includes a user-selectable shut down control 340 to shutdown computing device 102, and a user-selectable logoff control 342 to logoff of the computing system 100.

The user interface start page 300 may also include a user-configurable on-line selectable control 344 with which a user can designate an on-line status before transitioning onto a desktop environment. Typically, when a user logs-on to a computing system, other users may be configured for display notification that the user is now on-line. However, with the on-line selectable control 344, the user can choose to transition to a desktop environment without other users being notified of a change in the user's on-line status.

Figure 4:
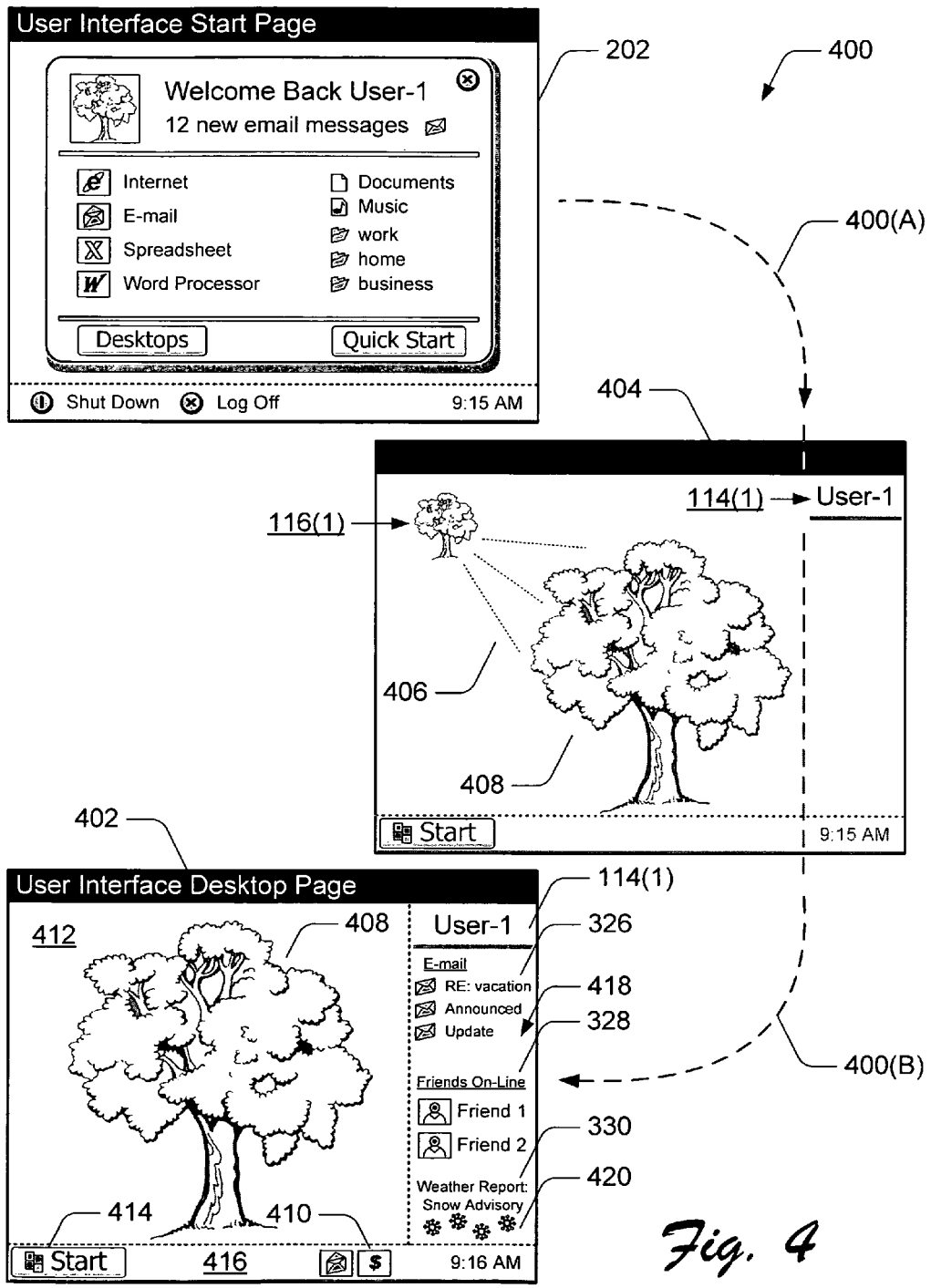
FIG. 4 illustrates an embodiment of a transition from an exemplary user interface start page to an exemplary user interface desktop page.

FIG. 4 illustrates an embodiment of a transition 400 from the exemplary user interface start page 202 to an exemplary user interface desktop page 402. The transition 400 is illustrated as a continually evolving display with a transition 400(A) from the user interface start page 202 to transition page(s) 404 and continuing with a transition 400(B) from the transition page(s) 404 to the user interface desktop page 402. Although shown as only one transition page or user interface display, transition page 404 is representative of any number of "frames" (e.g., to use a video reference) to represent a continuous, seamless, and uninterrupted transition from the user interface start page 202 to the user interface desktop page 402.

During the transition 400, a user-identifiable indicator corresponding to a selectable logon control (e.g., selected from the logon page 112) is displayed uninterrupted throughout the transition. For example, in an event that a user of the computing system 100 selects the selectable logon control 114(1), the user's name, User-1, and/or the corresponding image 116(1) is displayed throughout the transition 400(A-B) on the transition page(s) 404 and on the user interface desktop page 402. Additionally, the corresponding image 116(1) (or a portion of the image) may transform 406 to a full-size page display 408 of the image while being displayed throughout the transition 400(A-B) on the transition page(s) 404 and on the user interface desktop page 402. Further, the transition page(s) 404 can be visually animated to convey the transition 400 to a user utilizing any number of methods and techniques to visually animate the transition 400.

The exemplary user interface desktop page 402 can be displayed with any number of selectable controls, information, resources, and application program selectable start controls 410 that, when selected, initiate a display of information and/or an application program associated with the particular user logged-on to the computing system 100. The user interface desktop page 402 includes (optionally user-definable) various regions in which the user information and resources are displayed.

In this example, user interface desktop page 402 includes a desktop region 412, a start menu region 414 (e.g., a user-selectable control), a taskbar region 416, and a sidebar region 418. The various regions of the user interface desktop page 402 may include (optionally user-definable) any one or combination of application programs, documents, Web links, personal contacts, e-mail, and any other form of information, resources, and images such as live data feeds of news, sports, weather, and the like. For example, the desktop region includes the full-size page display 408 of the image 116 corresponding to the user currently logged on to computing system 100. Further, the sidebar region 418 includes the list of e-mail notifications 326 that each correspond to an e-mail received after a previous computing session was discontinued, the list of on-line users 328, and the weather report 330. The sidebar region 418 may also include any form of an image or graphic, such as image 420 corresponding to the weather report 330.

Methods for user interface start page, such as exemplary method 500 described with reference to FIG. 5, may be described in the general context of computer executable instructions. Generally, computer executable instructions include routines, programs, objects, components, data structures, procedures, and the like that perform particular functions or implement particular abstract data types. The methods may also be practiced in a distributed computing environment where functions are performed by remote processing devices that are linked through a communications network. In a distributed computing environment, computer executable instructions may be located in both local and remote computer storage media, including memory storage devices.

Figure 5:
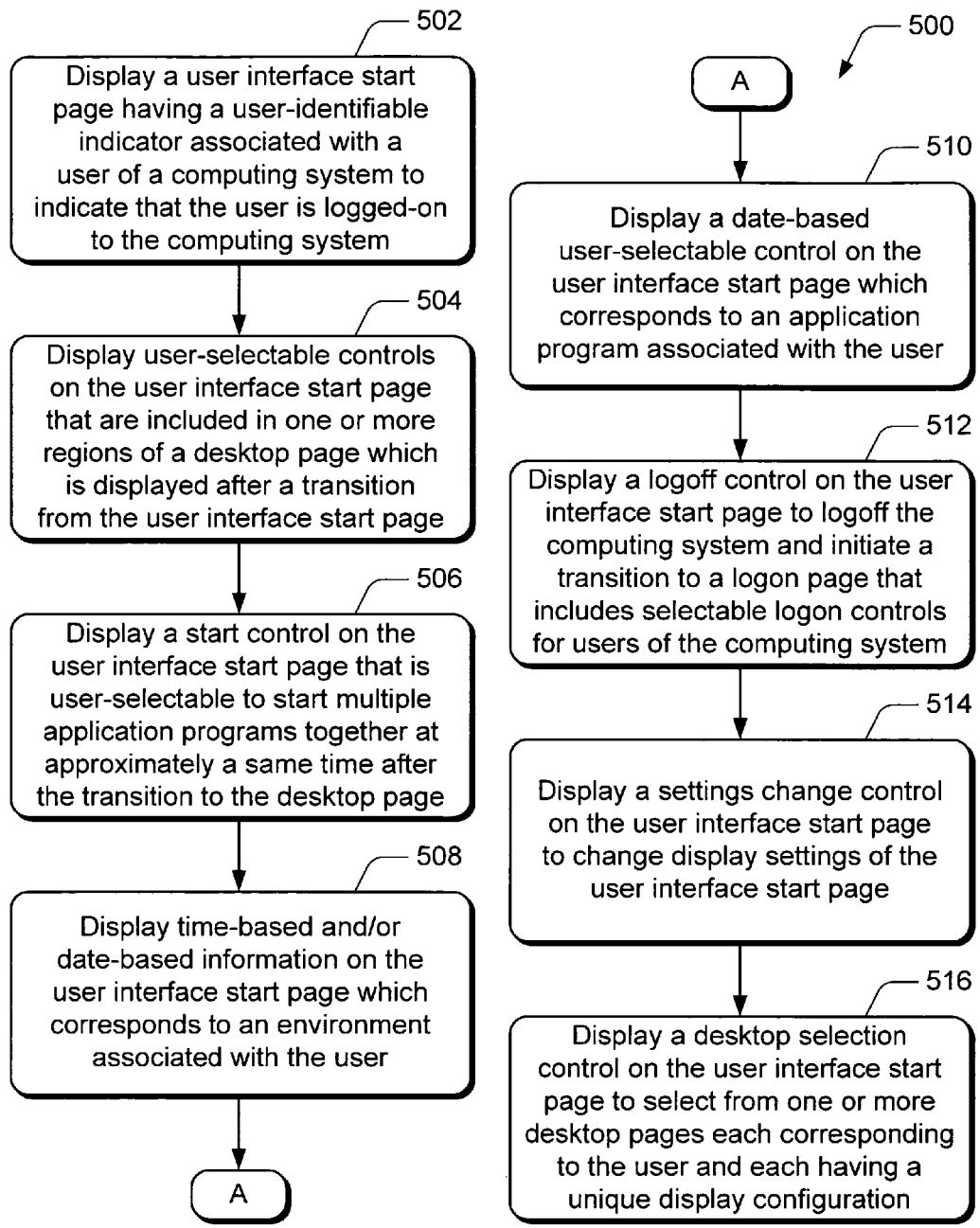
FIG. 5 is a flow diagram that illustrates an exemplary method for an embodiment of user interface start page.

FIG. 5 illustrates an exemplary method 500 for an embodiment of user interface start page. The order in which the method is described is not intended to be construed as a limitation, and any number of the described method blocks can be combined in any order to implement the method. Furthermore, the method can be implemented in any suitable hardware, software, firmware, or combination thereof.

At block 502, a user interface start page is displayed having a user-identifiable indicator associated with a user of a computing system to indicate that the user is logged-on to the computing system. For example, user interface start page 300 (FIG. 3) is displayed having a user name 302 and an image 304 associated with User-1 of computing system 100 (FIG. 1) to indicate that User-1 is logged-on to the computing system 100.

At block 504, user-selectable controls are displayed on the user interface start page that are included in one or more regions of a desktop page which is displayed after a transition from the user interface start page. Each of the user-selectable controls displayed on user interface start page 300 (FIG. 3) correspond to information associated with the user. For example, a list of resources can be displayed that each correspond to a resource recently accessed by the user or that correspond to a resource designated for user-selection from the user interface start page 300.

Additionally, a list of documents 322 can be displayed on the user interface start page 300 that each correspond to a document recently accessed by the user or that correspond to a document designated for user-selection from the start page. A list of directory locations 324 can be displayed on the user interface start page 300 that each correspond to a directory location recently selected for use by the user or that correspond to a directory location designated for user-selection from the start page. A list of application programs 312 can be displayed on the user interface start page 300 that each correspond to an application program recently selected for use by the user or that correspond to an application program designated for user-selection from the start page.

A list of on-line users 328 can be displayed on the user interface start page 300 that each correspond to a particular user selected for display notification when the particular user is on-line. Further, a list of e-mail notifications 326 can be displayed on the user interface start page 300 that each correspond to an e-mail received after a previous computing session was discontinued.

At block 506, a start control is displayed on the user interface start page, the start control being user-selectable to start multiple application programs together at approximately a same time after the transition to the desktop page. For example, the start control 306 (FIG. 3) is user-selectable to initiate a user-defined group of applications, a group of applications executing when a previous computing session was discontinued, a group of applications often selected for use, a group of applications recently selected for use, or a group of applications most used.

At block 508, time-based and/or date-based information is displayed on the user interface start page, the time-based and/or date-based information corresponding to an environment associated with the user. For example, a weather report 330 is displayed on the user interface start page 300 to advise of impending weather in an area where the user lives, and, after 4:30 p.m. on a weekday, for example, a traffic report 332 may be displayed to advise the user of the traffic conditions for a commute after work.

At block 510, a date-based user-selectable control is displayed on the user interface start page, the date-based user-selectable control corresponding to an application program associated with the user. For example, a date-based user-selectable control 334 is displayed on the user interface start page 300 for a financial application program associated with a user that regularly accesses a checkbook on the $20^{th}$ of every month. At block 512, a logoff control is displayed on the user interface start page, the logoff control being user-selectable to logoff the computing system and initiate a transition to a logon page that includes one or more selectable logon controls that each correspond to a different user of the computing system. For example, user-selectable logoff control 342 is displayed on the user interface start page 300.

At block 514, a settings change control is displayed on the user interface start page, the settings change control being user-selectable to change display settings of the user interface start page. For example, a user settings change control 338 is displayed on the user interface start page 300. At block 516, a desktop selection control is displayed on the user interface start page, the desktop selection control being user-selectable to select from one or more desktop pages each corresponding to the user and each having a unique display configuration. For example, the desktop selection control 316 is displayed on user interface start page 300 to select from desktop pages that include a work environment desktop, a home environment desktop, a weekend activities desktop, and a weekday activities desktop. Further, each of the desktop pages have a unique display configuration of any of the one or more regions of the user interface desktop page.

Figure 6:
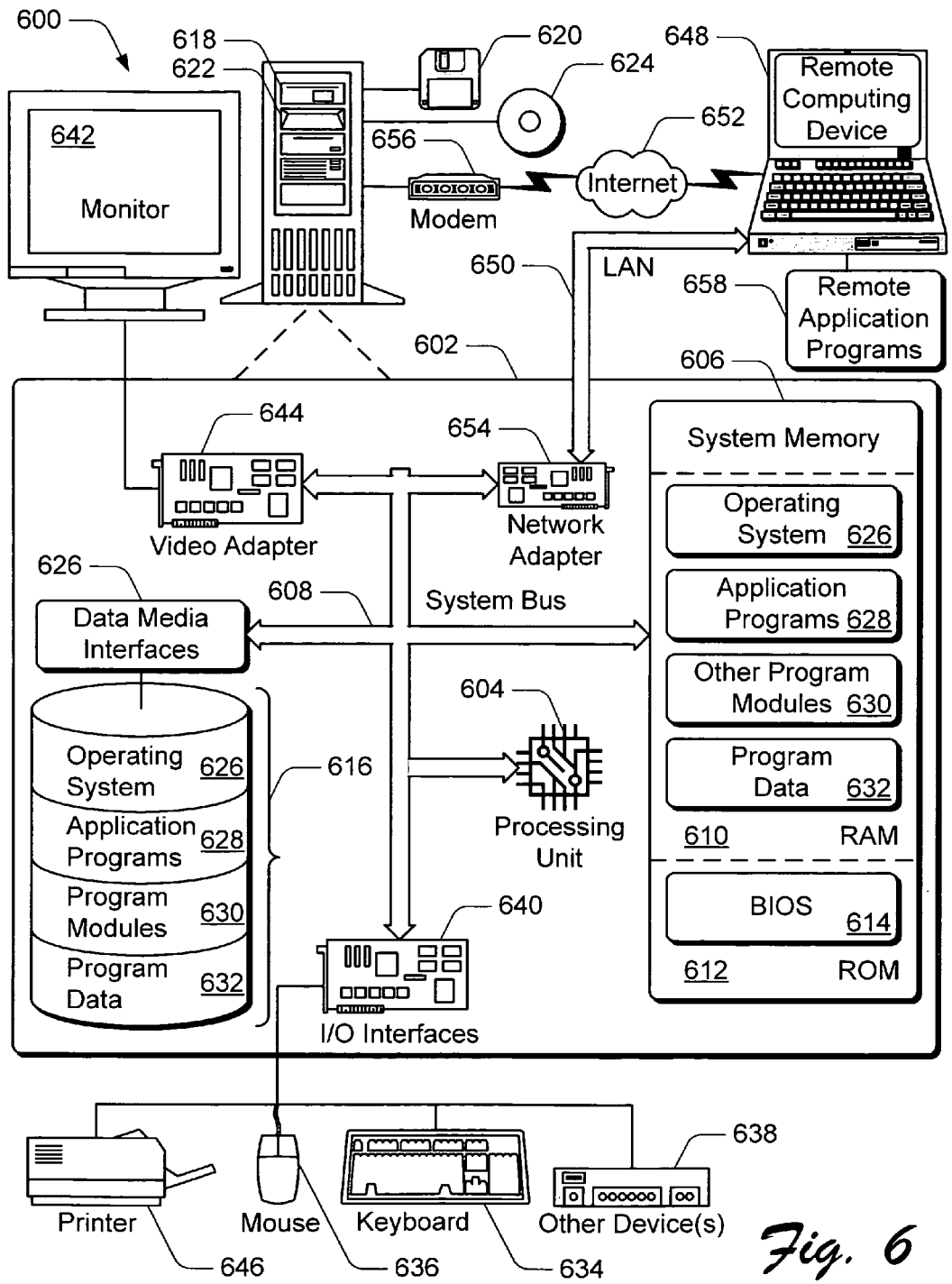
FIG. 6 illustrates exemplary computing systems, devices, and components in an environment that user interface start page can be implemented.

FIG. 6 illustrates an exemplary computing environment 600 within which user interface start page systems and methods, as well as the computing, network, and system architectures described herein, can be either fully or partially implemented. Exemplary computing environment 600 is only one example of a computing system and is not intended to suggest any limitation as to the scope of use or functionality of the architectures. Neither should the computing environment 600 be interpreted as having any dependency or requirement relating to any one or combination of components illustrated in the exemplary computing environment 600.

The computer and network architectures in computing environment 600 can be implemented with numerous other general purpose or special purpose computing system environments or configurations. Examples of well known computing systems, environments, and/or configurations that may be suitable for use include, but are not limited to, personal computers, server computers, client devices, hand-held or laptop devices, microprocessor-based systems, multiprocessor systems, set top boxes, programmable consumer electronics, network PCs, minicomputers, mainframe computers, gaming consoles, distributed computing environments that include any of the above systems or devices, and the like.

The computing environment 600 includes a general-purpose computing system in the form of a computing device 602. The components of computing device 602 can include, but are not limited to, one or more processors 604 (e.g., any of microprocessors, controllers, and the like), a system memory 606, and a system bus 608 that couples the various system components. The one or more processors 604 process various computer executable instructions to control the operation of computing device 602 and to communicate with other electronic and computing devices. The system bus 608 represents any number of several types of bus structures, including a memory bus or memory controller, a peripheral bus, an accelerated graphics port, and a processor or local bus using any of a variety of bus architectures.

Computing environment 600 includes a variety of computer readable media which can be any media that is accessible by computing device 602 and includes both volatile and non-volatile media, removable and non-removable media. The system memory 606 includes computer-readable media in the form of volatile memory, such as random access memory (RAM) 610, and/or non-volatile memory, such as read only memory (ROM) 612. A basic input/output system (BIOS) 614 maintains the basic routines that facilitate information transfer between components within computing device 602, such as during start-up, and is stored in ROM 612. RAM 610 typically contains data and/or program modules that are immediately accessible to and/or presently operated on by one or more of the processors 604.

Computing device 602 may include other removable/non-removable, volatile/non-volatile computer storage media. By way of example, a hard disk drive 616 reads from and writes to a non-removable, non-volatile magnetic media (not shown), a magnetic disk drive 618 reads from and writes to a removable, non-volatile magnetic disk 620 (e.g., a "floppy disk"), and an optical disk drive 622 reads from and/or writes to a removable, non-volatile optical disk 624 such as a CD-ROM, digital versatile disk (DVD), or any other type of optical media. In this example, the hard disk drive 616, magnetic disk drive 618, and optical disk drive 622 are each connected to the system bus 608 by one or more data media interfaces 626. The disk drives and associated computer readable media provide non-volatile storage of computer readable instructions, data structures, program modules, and other data for computing device 602.

Any number of program modules can be stored on the hard disk 616, magnetic disk 620, optical disk 624, ROM 612, and/or RAM 610, including by way of example, an operating system 626, one or more application programs 628, other program modules 630, and program data 632. Each of such operating system 626, application programs 628, other program modules 630, and program data 632 (or some combination thereof) may include an embodiment of the systems and methods described herein.

Computing device 602 can include a variety of computer readable media identified as communication media. Communication media typically embodies computer readable instructions, data structures, program modules, or other data in a modulated data signal such as a carrier wave or other transport mechanism and includes any information delivery media. The term "modulated data signal" refers to a signal that has one or more of its characteristics set or changed in such a manner as to encode information in the signal. By way of example, and not limitation, communication media includes wired media such as a wired network or direct-wired connection, and wireless media such as acoustic, RF, infrared, other wireless media, and any combination thereof.

A user can interface with computing device 602 via any number of different input devices such as a keyboard 634 and pointing device 636 (e.g., a "mouse"). Other input devices 638 (not shown specifically) may include a microphone, joystick, game pad, controller, satellite dish, serial port, scanner, and/or the like. These and other input devices are connected to the processors 604 via input/output interfaces 640 that are coupled to the system bus 608, but may be connected by other interface and bus structures, such as a parallel port, game port, and/or a universal serial bus (USB).

A monitor 642 or other type of display device can be connected to the system bus 608 via an interface, such as a video adapter 644. In addition to the monitor 642, other output peripheral devices can include components such as speakers (not shown) and a printer 646 which can be connected to computing device 602 via the input/output interfaces 640.

Computing device 602 can operate in a networked environment using logical connections to one or more remote computers, such as a remote computing device 648. By way of example, the remote computing device 648 can be a personal computer, portable computer, a server, a router, a network computer, a peer device or other common network node, and the like. The remote computing device 648 is illustrated as a portable computer that can include many or all of the elements and features described herein relative to computing device 602.

Logical connections between computing device 602 and the remote computing device 648 are depicted as a local area network (LAN) 650 and a general wide area network (WAN) 652. Such networking environments are commonplace in offices, enterprise-wide computer networks, intranets, and the Internet. When implemented in a LAN networking environment, the computing device 602 is connected to a local network 650 via a network interface or adapter 654. When implemented in a WAN networking environment, the computing device 602 typically includes a modem 656 or other means for establishing communications over the wide area network 652. The modem 656, which can be internal or external to computing device 602, can be connected to the system bus 608 via the input/output interfaces 640 or other appropriate mechanisms. The illustrated network connections are exemplary and other means of establishing communication link(s) between the computing devices 602 and 648 can be utilized.

In a networked environment, such as that illustrated with computing environment 600, program modules depicted relative to the computing device 602, or portions thereof, may be stored in a remote memory storage device. By way of example, remote application programs 658 are maintained with a memory device of remote computing device 648. For purposes of illustration, application programs and other executable program components, such as the operating system 626, are illustrated herein as discrete blocks, although it is recognized that such programs and components reside at various times in different storage components of the computing device 602, and are executed by the processors 604 of the computing device.

Although embodiments of user interface start page have been described in language specific to structural features and/or methods, it is to be understood that the subject of the appended claims is not necessarily limited to the specific features or methods described. Rather, the specific features and methods are enclosed as exemplary implementations of user interface start page.

The invention claimed is:

1. A user interface displayed on a display of a computing system, the user interface for enhancing a computing session by providing seamless continuity when a user logs onto the computing system, the user interface comprising:
   a logon page which is displayed to the user prior to logging onto the computing system, the logon page including:
   one or more selectable logon controls; and
   one or more user-identifiable indicators corresponding to the user, wherein each displayed user-identifiable indicator is associated with its corresponding selectable logon control displayed on the logon page; and a user interface start page displayed in response to user selection of the selectable logon control via the logon page, the user interface start page displayed to the user after a first transition from the logon page but prior to a second transition to a desktop page, wherein the user interface start page and the desktop page each include the user-identifiable indicator corresponding to the user, wherein the user-identifiable indicator is a scalable image shown to continually evolve in size during the first and second transitions, wherein the user identifiable indicator appears in a scale distinct from the scale in which it appears on the logon page, wherein the user-identifiable indicator is displayed uninterrupted throughout the first transition and throughout the second transition, and wherein the user interface start page further includes;
   user-selectable controls from one or more regions of the desktop page which is displayed after the second transition, each of the user selectable controls configured to initiate a display of information associated with the user when selected;
   a start control that is user-selectable to initiate that multiple application programs start together at approximately a same time after the transition to the desktop page and after a single user input; and
   a user-configurable on-line selectable control on the user interface start page which permits the user to designate an on-line status before transitioning to the desktop page, wherein the user is permitted via the user-configurable on-line selectable control to select a status wherein at least one other user is not notified that the user has changed status from off-line to on-line.

2. A user interface as recited in claim 1, wherein the user interface start page further comprises a start control configured to initiate that a group of application programs start together at approximately a same time after the transition to the desktop page, the group of application programs including application programs executing when a previous computing session was discontinued.

3. A user interface as recited in claim 1, wherein the user interface start page further comprises a start control configured to initiate that a group of application programs start together at approximately a same time after the transition to the desktop page, the group of application programs including application programs often selected for use by the user.

4. A user interface as recited in claim 1, wherein the user interface start page further comprises a start control configured to initiate that a group of application programs start together at approximately a same time after the transition to the desktop page, the group of application programs including application programs recently selected for use by the user.

5. A user interface as recited in claim 1, wherein the user interface start page further comprises a time-based display of information corresponding to an environment associated with the user.

6. A user interface as recited in claim 1, wherein the user interface start page further comprises a date-based display of information corresponding to an environment associated with the user.

7. A user interface as recited in claim 1, wherein the user interface start page further comprises a date-based user-selectable control corresponding to an application program associated with the user.

8. A user interface as recited in claim 1, wherein the user interface start page further comprises a logoff control configured for user-selection to logoff the computing system and initiate a transition to a logon page that includes one or more selectable logon controls that each correspond to a different user of the computing system.

9. A user interface as recited in claim 1, wherein the user interface start page further comprises a settings change control configured for user-selection to change display settings of the user interface start page.

10. A user interface as recited in claim 1, wherein the user interface start page further comprises a desktop selection control configured for user-selection to select from one or more desktop pages each corresponding to the user and each having a unique display configuration.

11. A user interface as recited in claim 1, wherein the user interface start page further comprises a desktop selection control configured for user-selection to select from one or more desktop pages each corresponding to the user and each having a unique display configuration of any of the one or more regions of the desktop page.

12. A user interface as recited in claim 1, wherein the user interface start page further comprises a desktop selection control configured for user-selection to select from one or more desktop pages that include at least one of a work environment desktop, a home environment desktop, a weekend activities desktop, and a weekday activities desktop.

13. A user interface as recited in claim 1, wherein the user selectable controls of the user interface start page include a list of resources that each correspond to at least one of (i) a resource recently accessed by the user and (ii) a resource designated for user-selection from the user interface start page.

14. A user interface as recited in claim 1, wherein the user selectable controls of the user interface start page include a list of resources that each correspond to a resource recently accessed by the user, and wherein a resource is initiated for display when the corresponding user-selectable control is selected and after the transition to the desktop page.

15. A user interface as recited in claim 1, wherein the user selectable controls of the user interface start page include a list of resources that each correspond to a resource designated for user-selection from the user interface start page, and wherein a resource is initiated for display when the corresponding user-selectable control is selected and after the transition to the desktop page.

16. A user interface as recited in claim 1, wherein the user selectable controls of the user interface start page include a list of documents that each correspond to at least one of (i) a document recently accessed by the user and (ii) a document designated for user-selection from the user interface start page.

17. A user interface as recited in claim 1, wherein the user selectable controls of the user interface start page include a list of directory locations that each correspond to at least one of (i) a directory location recently selected for use by the user and (ii) a directory location designated for user-selection from the user interface start page.

18. A user interface as recited in claim 1, wherein the user selectable controls of the user interface start page include a list of application programs that each correspond to at least one of (i) an application program recently selected for use by the user and (ii) an application program designated for user-selection from the user interface start page.

19. A user interface as recited in claim 1, wherein the user selectable controls of the user interface start page include a list of application programs that each correspond to an application program recently selected for use by the user, and wherein an application program is initiated when the corresponding user-selectable control is selected and after the transition to the desktop page.

20. A user interface as recited in claim 1, wherein the user selectable controls of the user interface start page include a list of application programs that each correspond to an application program designated for user-selection from the user interface start page, and wherein an application program is initiated when the corresponding user-selectable control is selected and after the transition to the desktop page.

21. A user interface as recited in claim 1, wherein the user selectable controls of the user interface start page include a list of on line users that each correspond to a particular user selected for display notification when the particular user is on-line.

22. A user interface as recited in claim 1, wherein the user selectable controls of the user interface start page include a list of e-mail notifications that each correspond to an e-mail received after a previous computing session was discontinued.

23. A user interface as recited in claim 1, wherein the user selectable controls of the user interface start page include a list of e-mail notifications that each correspond to an e-mail received after a previous computing session was discontinued, and wherein an e-mail is configured to be displayed when the corresponding e-mail notification is selected and after the transition to the desktop page.

24. A method for providing seamless continuity when a user logs onto a computing system, the method comprising: displaying, on a display device, a logon page to the user, the logon page including a user-identifiable indicator corresponding to the user, wherein the user-identifiable indicator is associated with a selectable logon control displayed on the logon page, wherein the selectable logon control that is displayed on the logon page is selectable via a user input to the computing system; displaying a user interface start page in response to user selection of the selectable logon control via the logon page, the user interface start page displayed to the user after a first transition from the logon page but prior to a second transition to a desktop page, wherein the user interface start page and the desktop page each include the user-identifiable indicator corresponding to the user, wherein the user-identifiable indicator is a scalable image shown to continually evolve in size during the first and second transitions, wherein the user identifiable indicator appears in a scale distinct from the scale in which it appears on the logon page, and wherein the user-identifiable indicator is displayed uninterrupted throughout the first transition and throughout the second transition; and displaying user-selectable controls on the user interface start page that are included in one or more regions of the desktop page which is displayed after the second transition, each of the user selectable controls configured to initiate a display of information associated with the user when selected; and wherein the user interface start page further comprises a start control that is user-selectable to initiate that multiple application programs start together at approximately a same time after the transition to the desktop page and after a single user input, and wherein the user interface start page is further configured to display a user-configurable on-line selectable control on the user interface start page which permits the user to designate an on-line status before transitioning to the desktop page, wherein the user is permitted via the user-configurable on-line selectable control to select a status wherein at least one other user is not notified that the user has changed status from off-line to on-line.

25. A method as recited in claim 24, further comprising displaying a start control on the user interface start page, the start control being user-selectable to start a group of application programs together after the transition to the desktop page, the group of application programs including application programs executing when a previous computing session was discontinued.

26. A method as recited in claim 24, further comprising displaying a start control on the user interface start page, the start control being user-selectable to start a group of application programs together after the transition to the desktop page, the group of application programs including application programs often selected for use by the user.

27. A method as recited in claim 24, further comprising displaying a start control on the user interface start page, the start control being user-selectable to start a group of application programs together after the transition to the desktop page, the group of application programs including application programs recently selected for use by the user.

28. A method as recited in claim 24, further comprising displaying time-based information on the user interface start page, the time-based information corresponding to an environment associated with the user.

29. A method as recited in claim 24, further comprising displaying date-based information on the user interface start page, the date-based information corresponding to an environment associated with the user.

30. A method as recited in claim 24, further comprising displaying a date-based user-selectable control on the user interface start page, the date-based user-selectable control corresponding to an application program associated with the user.

31. A method as recited in claim 24, further comprising displaying a logoff control on the user interface start page, the logoff control being user selectable to logoff the computing system and initiate a transition to a logon page that includes one or more selectable logon controls that each correspond to a different user of the computing system.

32. A method as recited in claim 24, further comprising displaying a settings change control on the user interface start page, the settings change control being user-selectable to change display settings of the user interface start page.

33. A method as recited in claim 24, further comprising displaying a desktop selection control on the user interface start page, the desktop selection control being user-selectable to select from one or more desktop pages each corresponding to the user and each having a unique display configuration.

34. A method as recited in claim 24, further comprising displaying a desktop selection control on the user interface start page, the desktop selection control being user-selectable to select from one or more desktop pages each corresponding to the user and each having a unique display configuration of any of the one or more regions of the desktop page.

35. A method as recited in claim 24, further comprising displaying a desktop selection control on the user interface start page, the desktop selection control being user-selectable to select from one or more desktop pages that include at least one of a work environment desktop, a home environment desktop, a weekend activities desktop, and a weekday activities desktop.

36. A method as recited in claim 24, wherein displaying the user selectable controls includes displaying a list of resources that each correspond to a resource recently accessed by the user.

37. A method as recited in claim 24, wherein displaying the user selectable controls includes displaying a list of resources that each correspond to a resource designated for user-selection from the user interface start page.

38. A method as recited in claim 24, wherein displaying the user selectable controls includes displaying a list of documents that each correspond to a document recently accessed by the user.

39. A method as recited in claim 24, wherein displaying the user selectable controls includes displaying a list of documents that each correspond to a document designated for user-selection from the user interface start page.

40. A method as recited in claim 24, wherein displaying the user selectable controls includes displaying a list of directory locations that each correspond to a directory location recently selected for use by the user.

41. A method as recited in claim 24, wherein displaying the user selectable controls includes displaying a list of directory locations that each correspond to a directory location designated for user-selection from the user interface start page.

42. A method as recited in claim 24, wherein displaying the user selectable controls includes displaying a list of application programs that each correspond to an application program recently selected for use by the user.

43. A method as recited in claim 24, wherein displaying the user selectable controls includes displaying a list of application programs that each correspond to an application program designated for user-selection from the user interface start page.

44. A method as recited in claim 24, wherein displaying the user selectable controls includes displaying a list of on-line users that each correspond to a particular user selected for display notification when the particular user is on-line.

45. A method as recited in claim 24, wherein displaying the user selectable controls includes displaying a list of e-mail notifications that each correspond to an e-mail received after a previous computing session was discontinued.

46. One or more computer readable storage media comprising computer executable instructions that, when executed, direct a computing device to perform the method of claim 24.

47. One or more computer readable storage media comprising computer executable instructions that, when executed, direct a computing device to: display a logon page to the user, the logon page including a user-identifiable indicator corresponding to the user, wherein the user-identifiable indicator is associated with a selectable logon control displayed on the logon page; and display a user interface start page in response to user selection of the selectable logon control via the logon page, the user interface start page displayed to the user after a first transition from the logon page but prior to a second transition to a desktop page, wherein the user interface start page and the desktop page each include the user identifiable indicator corresponding to the user, wherein the user-identifiable indicator is a scalable image shown to continually evolve in size during the first and second transitions, wherein the user identifiable indicator appears in a scale distinct from the scale in which it appears on the logon page, and wherein the user-identifiable indicator is displayed uninterrupted throughout the first transition and throughout the second transition; display user-selectable controls on the user interface start page that are included in one or more regions of the desktop page which is displayed after the second transition, each of the user selectable controls configured to initiate a display of information associated with the user when selected; and wherein the user interface start page further comprises a start control that is user-selectable to initiate that multiple application programs start together at approximately a same time after the transition to the desktop page and after a single user input; and display a user-configurable on-line selectable control on the user interface start page which permits the user to designate an on-line status before transitioning to the desktop page, wherein the user is permitted via the user-configurable on-line selectable control to select a status wherein at least one other user is not notified that the user has changed status from off-line to on-line.

48. One or more computer readable media as recited in claim 47, further comprising computer executable instructions that, when executed, direct the computing device to display a start control on the user interface start page, the start control being user-selectable to start a group of application programs together at approximately a same time, the group of application programs including application programs executing when a previous computing session was discontinued.

49. One or more computer readable media as recited in claim 47, further comprising computer executable instructions that, when executed, direct the computing device to display a start control on the user interface start page, the start control being user-selectable to start a group of application programs together at approximately a same time, the group of application programs including application programs often selected for use by the user.

50. One or more computer readable media as recited in claim 47, further comprising computer executable instructions that, when executed, direct the computing device to display a start control on the user interface start page, the start control being user-selectable to start a group of application programs together at approximately a same time, the group of application programs including application programs recently selected for use by the user.

51. One or more computer readable media as recited in claim 47, further comprising computer executable instructions that, when executed, direct the computing device to display time-based information on the user interface start page, the time-based information corresponding to an environment associated with the user.

52. One or more computer readable media as recited in claim 47, further comprising computer executable instructions that, when executed, direct the computing device to display date-based information on the user interface start page, the date-based information corresponding to an environment associated with the user.

53. One or more computer readable media as recited in claim 47, further comprising computer executable instructions that, when executed, direct the computing device to display a date-based user-selectable control on the user interface start page, the date-based user-selectable control corresponding to an application program associated with the user.

54. One or more computer readable media as recited in claim 47, further comprising computer executable instructions that, when executed, direct the computing device to display a logoff control on the user interface start page, the logoff control being user-selectable to logoff the computing system and initiate a transition to a logon page that includes one or more selectable logon controls that each correspond to a different user of the computing system.

55. One or more computer readable media as recited in claim 47, further comprising computer executable instructions that, when executed, direct the computing device to display a settings change control on the user interface start page, the settings change control being user-selectable to change display settings of the user interface start page.

56. One or more computer readable media as recited in claim 47, further comprising computer executable instructions that, when executed, direct the computing device to display a desktop selection control on the user interface start page, the desktop selection control being user-selectable to select from one or more desktop pages each corresponding to the user and each having a unique display configuration.

57. One or more computer readable media as recited in claim 47, further comprising computer executable instructions that, when executed, direct the computing device to display the user-selectable controls to include a list of resources that are each associated with the user.

58. One or more computer readable media as recited in claim 47, further comprising computer executable instructions that, when executed, direct the computing device to display the user-selectable controls to include a list of documents that are each associated with the user.

59. One or more computer readable media as recited in claim 47, further comprising computer executable instructions that, when executed, direct the computing device to display the user-selectable controls to include a list of directory locations that are each associated with the user.

60. One or more computer readable media as recited in claim 47, further comprising computer executable instructions that, when executed, direct the computing device to display the user-selectable controls to include a list of application programs that are each associated with the user.

61. One or more computer readable media as recited in claim 47, further comprising computer executable instructions that, when executed, direct the computing device to display the user-selectable controls to include a list of on line users that each correspond to a particular user selected for display notification when the particular user is on-line.

62. One or more computer readable media as recited in claim 47, further comprising computer executable instructions that, when executed, direct the computing device to display the user-selectable controls to include a list of e mail notifications that each correspond to an e-mail received after a previous computing session was discontinued.

* * * * *